United States Patent
Chang et al.

(10) Patent No.: US 12,477,228 B2
(45) Date of Patent: Nov. 18, 2025

(54) SHELF DEVICE WITH A MOVABLE CAMERA FOR PRODUCT CAPTURE, UNMANNED SALES SYSTEM, AND SALES MANAGEMENT SYSTEM FOR UNMANNED STORES

(71) Applicant: Futuregate Co., Ltd., Hanam-si (KR)

(72) Inventors: Joongho Chang, Seongnam-si (KR); Wonhoon Choi, Seoul (KR)

(73) Assignee: Futuregate Co., Ltd., Hanam-si (KR)

( * ) Notice: Subject to any disclaimer, the term of this patent is extended or adjusted under 35 U.S.C. 154(b) by 0 days.

(21) Appl. No.: 19/183,602

(22) Filed: Apr. 18, 2025

(65) Prior Publication Data

US 2025/0294257 A1    Sep. 18, 2025

Related U.S. Application Data

(63) Continuation of application No. 18/964,342, filed on Nov. 29, 2024, now abandoned.

(30) Foreign Application Priority Data

Mar. 15, 2024 (KR) .................. 10-2024-0036615
Jul. 2, 2024 (KR) .................. 10-2024-0087085

(51) Int. Cl.
  *G06Q 30/0601* (2023.01)
  *G01G 19/52* (2006.01)
  (Continued)

(52) U.S. Cl.
  CPC .......... *H04N 23/695* (2023.01); *G01G 19/52* (2013.01); *G06Q 30/0609* (2013.01);
  (Continued)

(58) Field of Classification Search
  None
  See application file for complete search history.

(56) References Cited

U.S. PATENT DOCUMENTS 11,529,210 B2 * 12/2022 Ramirez Luna ..... H04N 13/254
2008/0077510 A1    3/2008 Dielemans
(Continued)

FOREIGN PATENT DOCUMENTS

JP    H8-101963 A    4/1996
JP    2001-88912 A    4/2001
(Continued)

OTHER PUBLICATIONS

X. Fan, Y. Yan, P. Yang and F. Han, "CMSS: Use Low-power IoT Cameras to Monitor Store Shelves," 2021 7th International Conference on Big Data Computing and Communications (BigCom), Deqing, China, 2021, pp. 309-315, doi: 10.1109/BigCom53800.2021.00008 (Year: 2021).*

(Continued)

*Primary Examiner* — Michelle T Kringen
(74) *Attorney, Agent, or Firm* — Mei & Mark LLP; Manni Li

(57) ABSTRACT

The unmanned sales system has a weight sensor for detecting whether a product has been retrieved from or inserted into each of plural placement areas on a shelf where products to be sold are placed, a camera for capturing the products on the shelf, a moving device for moving the camera to change its capturing area, a control unit that controls the moving device to move the camera to the placement area detected by the weight sensor, and a product identification unit that identifies the retrieved or inserted product based on the image of the placement area captured by the camera. Within the unmanned sales system, the camera moves to the area where the product retrieval or insertion is detected by the weight sensor and captures that area. Since the camera captures a narrow area, the resolution of the captured image is enhanced.

24 Claims, 14 Drawing Sheets

(51) Int. Cl.
*H04N 23/69* (2023.01)
*H04N 23/695* (2023.01)
*H04W 4/021* (2018.01)

(52) U.S. Cl.
CPC ......... *G06Q 30/0637* (2013.01); *H04N 23/69* (2023.01); *H04W 4/021* (2013.01)

(56) References Cited

U.S. PATENT DOCUMENTS

| | | | |
|---|---|---|---|
| 2020/0202137 A1 | 6/2020 | Li et al. | |
| 2021/0041159 A1* | 2/2021 | Uchida | F25D 11/02 |
| 2022/0084005 A1* | 3/2022 | Geiger | G06Q 20/202 |
| 2022/0207462 A1* | 6/2022 | Verma | G06Q 10/08 |
| 2023/0230033 A1* | 7/2023 | Hagen | H04N 23/69 705/28 |

FOREIGN PATENT DOCUMENTS

| | | |
|---|---|---|
| JP | 2002-74482 A | 3/2002 |
| JP | 2021-507203 A | 2/2021 |
| JP | 2021-192168 A | 12/2021 |
| KR | 10-1887685 B1 | 9/2018 |
| KR | 10-2021-0141234 A | 11/2021 |
| KR | 10-2022-0136626 A | 10/2022 |
| KR | 10-2022-0145072 A | 10/2022 |
| KR | 10-2544909 B1 | 6/2023 |
| KR | 10-2023-0108630 A | 7/2023 |
| KR | 10-2023-0146696 A | 10/2023 |
| KR | 10-2023-0167681 A | 12/2023 |

OTHER PUBLICATIONS

Japanese Office Action issued for JP2025016797, 4 pages, mailed on May 13, 2025.

* cited by examiner

SHELF DEVICE WITH A MOVABLE CAMERA FOR PRODUCT CAPTURE, UNMANNED SALES SYSTEM, AND SALES MANAGEMENT SYSTEM FOR UNMANNED STORES

CROSS-REFERENCE TO RELATED APPLICATIONS

The subject application is a continuation of U.S. patent application Ser. No. 18/964,342 filed on Nov. 29, 2024, which in turn claims priority on Korean Patent Application Nos. 10-2024-0036615 filed on Mar. 15, 2024 and 10-2024-0087085 filed on Jul. 2, 2024 in the Korean Intellectual Property Office. The contents and subject matters of the U.S. and Korean priority applications are incorporated herein by reference.

TECHNICAL FIELD

The present invention relates to an unmanned sales system and a shelf device used therein, and more particularly, to an unmanned sales system equipped with a function to automatically recognize a product bought by a buyer and process the payment for the purchase, a shelf device used therein, and a sales management system for unmanned stores equipped with the same.

BACKGROUND ART

Unmanned sales counters offer the advantage of eliminating the need for a sales clerk to handle sales and payment tasks, leading to their increasing adoption. For product sales through an unmanned sales counter to proceed smoothly, it is crucial to accurately identify the products purchased by users. Unlike vending machines that handle only a few types of products, an unmanned sales counter must be capable of selling a wide variety of products and adapting to situations where the products being sold change frequently. Therefore, it is necessary to apply technology that can automatically identify the product retrieved by the user from the shelf when such retrieval occurs. Once the retrieved product is identified, the unmanned sales counter checks the price of the product recorded in the database and initiates a payment process for the buyer who retrieved it.

One method used to identify retrieved products involves the use of weight sensors and cameras.

Weight sensors are installed on the shelf where products are placed to detect the weight of the shelf. When the shelf weight changes, for instance, if the weight of the shelf decreases by 100 g, it can be determined that a product with a weight of 100 g has been retrieved by the user from the products placed on the shelf. A processor in the unmanned sales counter queries the product database, where the weight of each product is recorded, and identifies the product corresponding to the changed weight.

The camera captures the products on the shelf, especially capturing the products on the shelf after a weight change. From the captured image, the current products on the shelf are recognized, and the retrieved and inserted products are identified by comparing with the database that records the current shelf status.

For product identification, a method using either only the weight sensor or only the camera may be adopted. However, to enhance the accuracy of product identification, a method combining both the weight sensor and the camera is commonly used. In such a configuration, one of the weight sensor and the camera may take the primary role in product identification, with the other serving a supplementary function.

In conventional methods, multiple cameras are typically installed on a single unmanned sales counter. If one camera is used to capture all shelves of the unmanned sales counter, the resolution of the captured image may be too low to accurately specify the retrieved product. Additionally, as many products are included within a single image in this case, the computation required to compare the images before and after the weight change increases, along with the possibility of errors in the comparison results. Moreover, when only one camera is used, the camera must be positioned at a certain distance in front of the unmanned sales counter to capture a wide area, which may result in situations where products are obscured by the buyer, preventing the camera from capturing them. Due to these issues, it is inevitable to install multiple cameras on the unmanned sales counter, which increases manufacturing costs.

A method of installing a single camera for each layer of a multi-layered shelf has been used as a way to reduce the number of cameras as much as possible while increasing the accuracy of product identification through the captured images. However, in cases where, for example, the shelf is long and the capture area covered by a single camera is wide, the likelihood of errors in product identification increases.

SUMMARY OF THE INVENTION

The present invention has been conceived to resolve the aforementioned issues, and it is the object of the present invention to provide an unmanned sales system capable of increasing the accuracy of product identification by accurately capturing the area where a product has been retrieved and/or inserted, using a minimal number of cameras.

Another object of the present invention is to provide a shelf device that can be used with such an unmanned sales system.

Yet another object of the present invention is to provide a sales management system for unmanned stores that implements unmanned sales using this unmanned sales system.

To achieve the above object, the present invention provides an unmanned sales system comprising: a sensing means for sensing whether a product to be sold is retrieved from and/or inserted onto a shelf on which the product is placed, the sensing means sensing respectively for plural placement areas divided on the shelf; a camera for capturing the product on the shelf; a driving means for driving the camera to change capturing area of the camera; a control unit for controlling the driving means to change the capturing area of the camera so that the camera captures the placement area where a retrieval and/or an insertion of the product is sensed by the sensing means; and a product identification unit for identifying the retrieved and/or inserted product based on an image captured by the camera.

The sensing means can include a plurality of weight sensors installed in each of the plural placement areas.

The sensing means can include an operation sensor for sensing retrieving or inserting action for the product by a buyer in each of the plural placement areas.

The driving means can include a moving device for moving the camera. The moving device can include a guide rail, and a movement motor for moving the camera along the guide rail.

The moving device can be arranged horizontally along the shelf. The moving device is preferably arranged along an edge of a front end of the shelf.

The moving device can be installed on an upper side of the shelf, and can be installed on a lower side of the shelf.

Preferably, a plurality of said shelves are arranged in a layered manner in the vertical direction, and a plurality of said cameras and a plurality of said moving devices are equipped corresponding to each of the plurality of shelves.

A shielding member can be provided at the front end of the shelf to prevent the camera and the moving device from being exposed frontward of the shelf.

As another example, a plurality of said shelves are arranged in a layered manner in the vertical direction, and the moving device is arranged in the vertical direction. In that situation, a pair of said moving devices is provided at positions adjacent to each side of the shelf.

The driving means can include an angle adjustment unit that changes the capture angle of the camera. The driving means can further include a zoom drive unit that controls the camera's capture range to perform zoom-in and zoom-out shooting according to a distance between the camera and the placement area.

The driving means can include a multi-joint robot with the camera installed at a terminal end thereof.

According to another aspect of the present invention, a sales management system for unmanned stores is provided, which comprises the unmanned sales system of the above constitution.

The sales management system can further comprise: an identifying means for identifying each user who has entered the store; and a purchase verification unit for verifying the user as a buyer of the retrieved product, by associating the product confirmed by the unmanned sales system to have been retrieved from the shelf, with the user identified by the identifying means at the time of retrieval.

The identifying means can include: a user device, which includes one of a personal mobile terminal of the user and a tag provided to the user entering the store; and a location detector for detecting a location of the user device in the store.

According to still another aspect of the present invention, a shelf device is provided, which comprises a shelf on which products to be sold are placed; a sensing means for sensing whether the product is retrieved from and/or inserted onto a shelf on which the product is placed, the sensing means sensing respectively for plural placement areas divided on the shelf; a camera for capturing the product on the shelf; a driving means for driving the camera to change capturing area of the camera; a control unit for controlling the driving means to change the capturing area of the camera so that the camera captures the placement area where a retrieval and/or an insertion of the product is sensed by the sensing means; and a product identification unit for identifying the retrieved and/or inserted product based on an image captured by the camera.

The driving means can include a moving device for moving the camera. The moving device can include a guide rail, and a movement motor for moving the camera along the guide rail.

The shelf device of the present invention can further comprise a communication unit for transmitting an image captured by the camera to an external processor that performs operation of identifying the product.

The shelf device of the present invention can further comprise a product identification unit for identifying the retrieved and/or inserted product based on an image captured by the camera.

According to the present invention, in an unmanned sales system, the camera moves to the area where product retrieval and/or insertion has been detected by a sensing means, such as a weight sensor, and captures an image of that area. Since the camera captures a narrow area, the resolution of the captured image increases. Therefore, the accuracy of identifying the retrieved or inserted product through the captured image is improved.

DETAILED DESCRIPTION OF THE INVENTION

Below is a more detailed explanation of the present invention with reference to the drawings.

Figure 1:
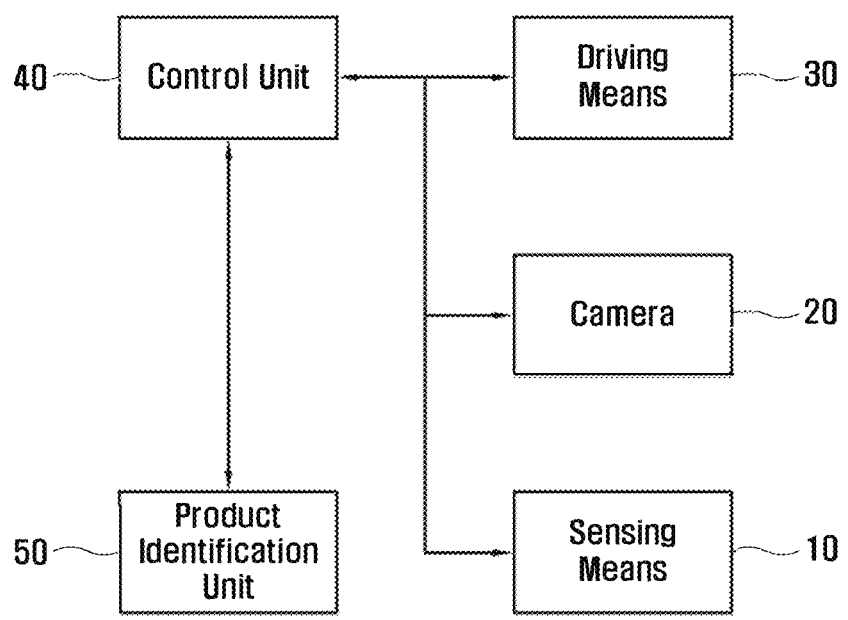
FIG. 1 is a schematic block diagram of the unmanned sales system according to the present invention.

FIG. 1 is a schematic block diagram of the unmanned sales system according to the present invention. The unmanned sales system of the present invention includes a sensing means 10, a camera 20, a driving means 30, a control unit 40, and a product identification unit 50.

The sensing means 10 senses whether a product placed in each of plural divided placement areas on a shelf, where products to be sold are placed, has been retrieved and/or inserted. The sensing means 10 consists of a weight sensor or an operation sensor, as described below. The camera 20 captures the products on the shelf. The driving means 30 drives the camera 20 to change its capturing area. The control unit 40 controls the driving means 30 to change the capturing area of the camera so that the camera captures the placement area where the retrieval and/or insertion of a product was detected by the sensing means 10. The product identification unit 50 identifies the retrieved and/or inserted product based on the detection results from the sensing means 10 and the image captured by the camera 20.

In addition to the illustrated elements, the unmanned sales system of the present invention includes additional elements necessary for unmanned sales, such as a payment unit for users to process payment for confirmed retrieved products. These additional elements do not constitute the technical features of the present invention, so detailed illustrations and descriptions thereof are omitted.

Figure 2:
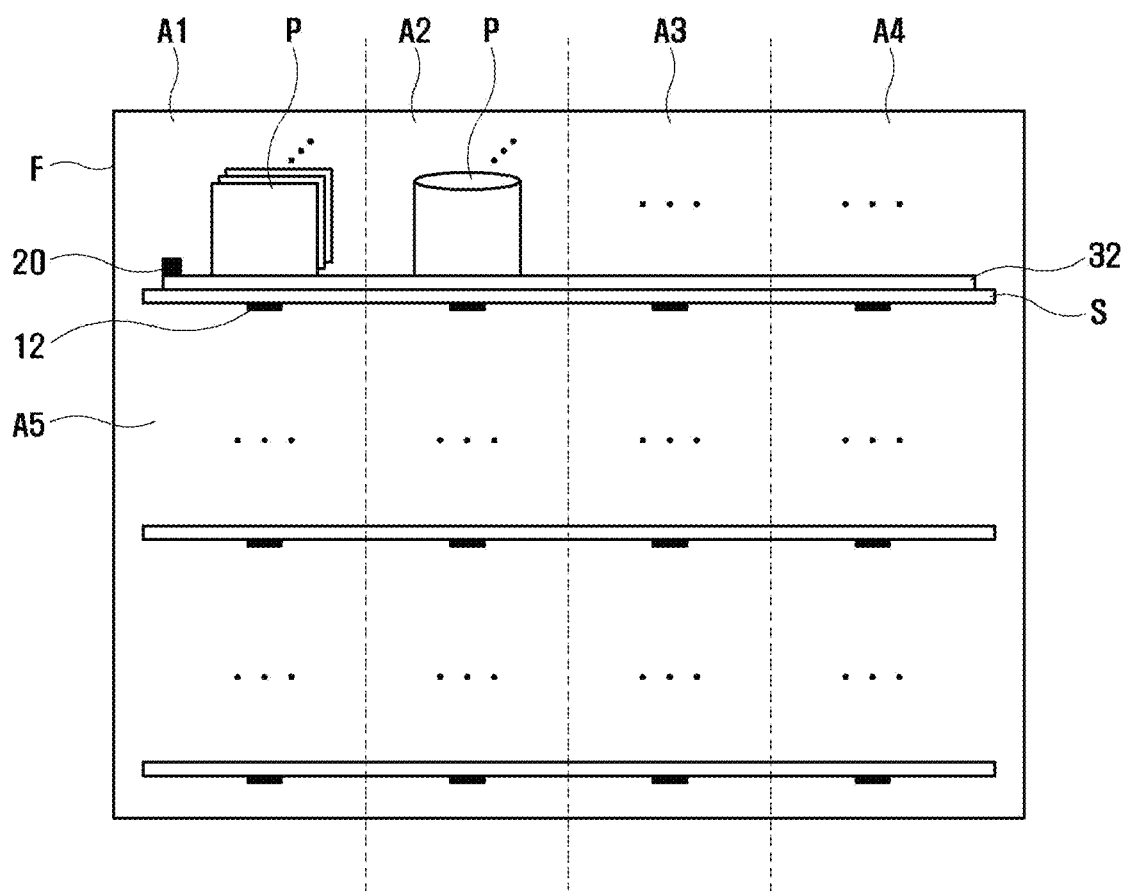
FIG. 2 is a schematic view of the unmanned sales system according to the first embodiment of the present invention.
Figure 3:
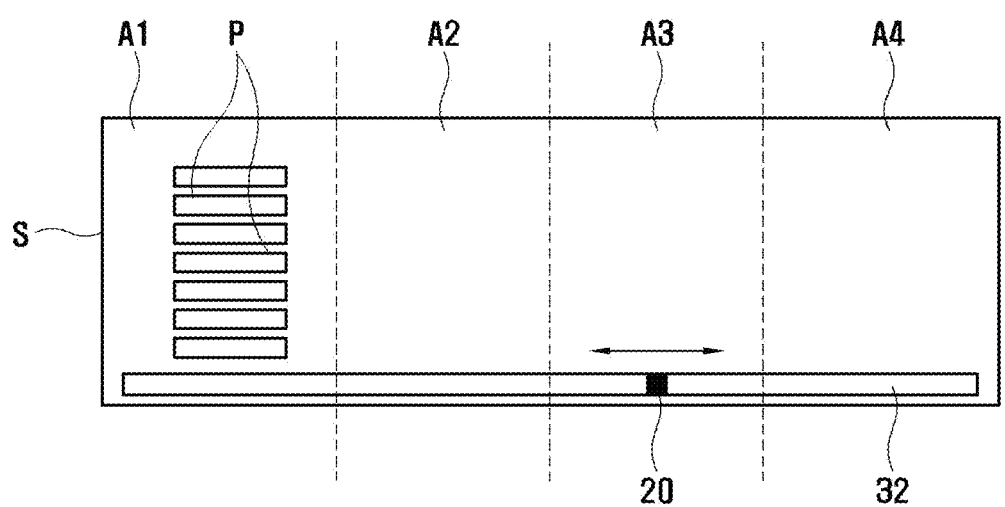
FIG. 3 is a view showing the top shelf in FIG. 2 from an upper perspective.

FIG. 2 is a schematic view of the unmanned sales system according to the first embodiment of the present invention, and FIG. 3 is a top view of the uppermost shelf in FIG. 2.

The unmanned sales system includes a frame F providing space to display and hold products P for sale. Inside the frame F, a plurality of shelves S are installed, with the products P to be sold placed on each shelf S.

The shelves S are arranged to form layers in the vertical direction, thereby dividing the internal space of the frame F into multiple vertical layers. In FIG. 2, the internal space is divided into three layers. The space on each shelf S is divided into a plurality of areas in the horizontal direction, and FIG. 2 shows each shelf S divided into four areas, resulting in a total of 12 placement areas within the frame F. Each placement area is labeled in order, starting from the top-left area as A1, A2, A3, A4, A5, and so on.

A weight sensor 12 is installed as the sensing means 10 under each shelf S in FIG. 1. The weight sensors 12 are arranged corresponding to each divided placement area. Each weight sensor 12 detects the weight of the product P in its respective placement area. When a product P is retrieved from or inserted into a placement area, a weight change in that area is detected by the weight sensor 12.

In this embodiment, a weight sensor 12 is exemplified as the sensing means 10, but the sensing means 10 could also be an operation sensor. The operation sensor detects the movement of objects or people; for instance, it detects the movement of a buyer's hand when the buyer reaches out to retrieve the product P. With an operation sensor installed for each placement area, the retrieval and insertion actions of the product by the buyer in each placement area are detected.

A moving device 32, which serves as the driving means 30 in FIG. 1, is installed on each shelf S. The camera 20 is positioned on each moving device 32, and each moving device 32 moves its respective camera 20.

Figure 4:
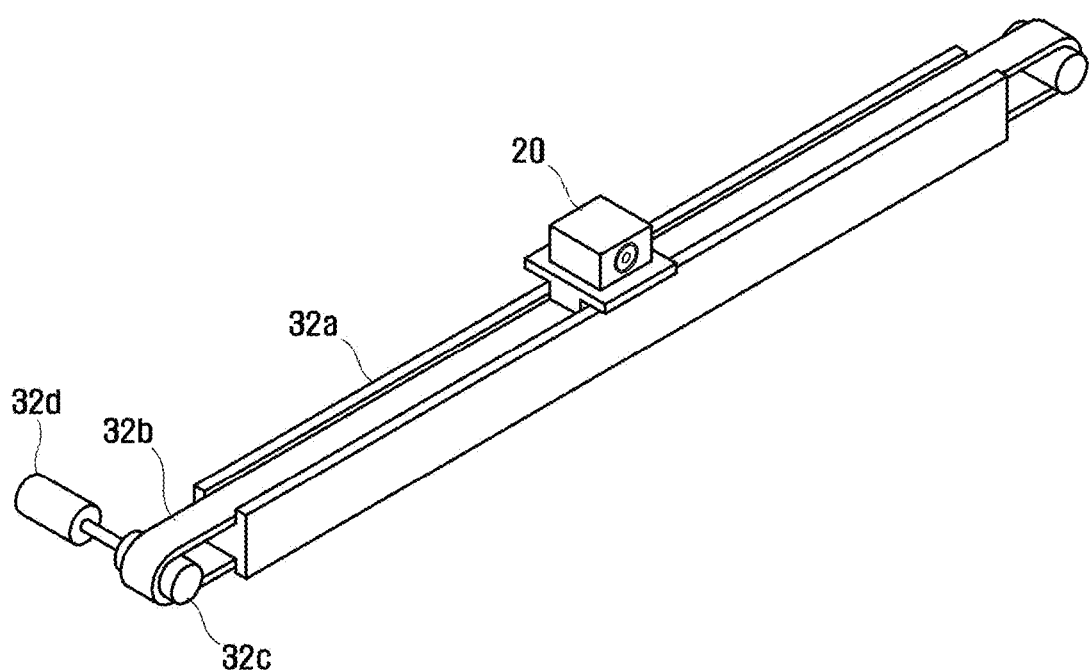
FIG. 4 is a view showing the moving device installed on the shelf in FIGS. 2 and 3.

FIG. 4 shows the moving device installed on the shelf in FIGS. 2 and 3.

The moving device 32 comprises a guide rail 32a in the form of a long bar, a moving belt 32b installed on the guide rail 32a where the camera 20 is placed, a moving motor 32d that drives the moving belt 32b to move the camera 20 along the guide rail 32a, and a roller 32c that transmits the rotational motion of the moving motor 32d to the moving belt 32b. Through the rotational drive of the moving motor 32d, the camera 20 on the moving belt 32b moves along the guide rail 32a. The direction of movement of the camera 20 is controlled by the rotation direction of the moving motor 32d, and the movement distance of the camera 20 is controlled by the rotation amount of the moving motor 32d. The moving motor 32d is configured as a servo motor or stepping motor to allow precise control of the camera's position.

As shown in FIGS. 2 and 3, the moving device 32 is arranged so that its length, i.e., the length of the guide rail 32a, extends horizontally along the shelf S. The guide rail 32a of the moving device 32 spans substantially the entire horizontal area of a single shelf S. Therefore, the position of the camera 20 moved by the moving device 32 can be set to correspond to any one of the placement areas A1, A2, A3, A4 within a single shelf S, as shown in FIG. 3.

As previously mentioned, the control unit 40 controls the moving device 32 to move the camera 20 to the location of one of the placement areas A1, A2, A3, A4. At this time, the control unit 40 controls the camera 20 to move to the placement area where a weight change was detected by the weight sensor 12. Thus, the products P displayed in the placement area with a detected weight change are captured by the camera 20, and an image of them is obtained. FIG. 2 shows the camera 20 moved to placement area A1, while FIG. 3 shows the camera 20 moved to placement area A3. For example, the camera 20 waits in placement area A1, as in FIG. 2, and when a weight change is detected in placement area A3, it moves to area A3, as in FIG. 3. The camera 20 then captures the product P in the moved-to placement area A3.

The product identification unit 50 identifies the retrieved and/or inserted product P based on the weight change detected by the weight sensor 12 and the image captured by the camera 20. Similar to conventional unmanned sales counters, the identification of the retrieved product P may utilize either the weight sensor 12 or the camera 20 alone, or both the weight sensor 12 and the camera 20, with one serving the primary identification function and the other serving as a supplementary function. In the present invention, identification of the retrieved product P using the camera 20 is employed as the primary identification method or, at the very least, as a complementary method to or alongside the identification by the weight sensor 12. Identification using the camera 20 involves comparing images taken by the camera 20 before and after a weight change is detected by the weight sensor 12 to extract the image of the retrieved product P, which is then compared with stored images in a product database to determine the retrieved product P. As previously mentioned, an operation sensor can also be used as the sensing means 10 in the present invention. Since the operation sensor detects only movement of objects or people, it merely detects the placement area as the target position for the camera 20 to move to, while the camera 20 alone is used to identify the retrieved product P.

Meanwhile, the weight sensor 12 detects both weight decrease and increase changes, and in cases of an increase, the camera 20 also moves to the placement area with the detected weight change to capture an image. Weight increases may occur, for example, when a buyer initially retrieves the product P intending to purchase it but decides to return it to the shelf S. In this case, by capturing the product P with the camera 20 at the corresponding placement area, the returned product P can be identified, allowing the unmanned sales system to process it as a product not purchased by the buyer. Additionally, if the returned product P is placed in a different placement area from where it was initially retrieved due to buyer carelessness, the camera 20 moves to the placement area where the product P was placed and captures it, enabling identification of the returned product P even if it differs from the original product in that area. In cases where the returned product P is placed among other products in that area, the returned product itself may not be captured by the camera 20, and instead, another product originally placed there may be captured. In such cases, the unmanned sales system queries the database for a product corresponding to the detected weight change, allowing the specific returned product in the placement area to be identified. This approach, in which the camera 20 moves to and captures the placement area where a weight change is detected, can be usefully applied to various scenarios within the present invention.

Figure 5:
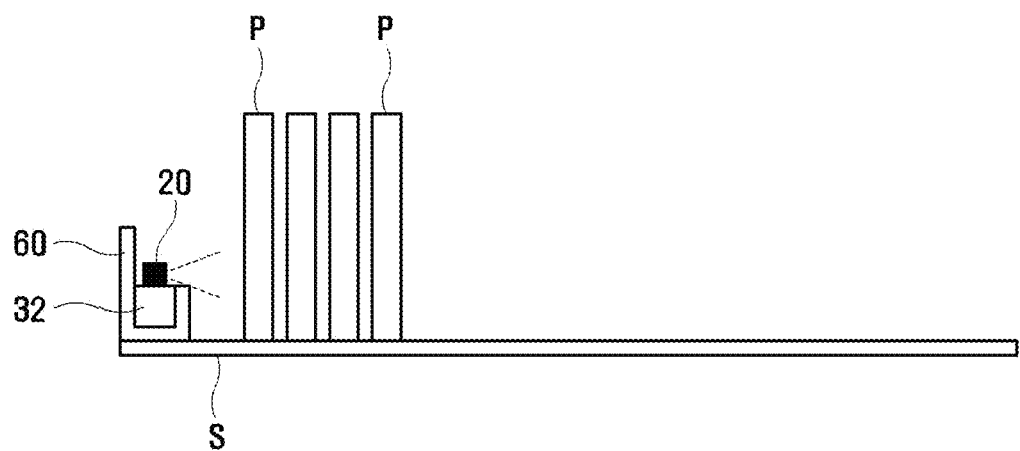
FIG. 5 is a side view of FIG. 3.

FIG. 5 is a side view of FIG. 3. As shown in FIG. 5, the moving device 32 is arranged along the front edge of the shelf S, and the camera 20 is positioned to capture the rearward view. Typically, identical products P are placed in rows in the front-to-back direction of a single placement area on the shelf S. Since only the product P positioned at the front of the row is exposed to allow almost full capture, it is preferable to arrange the camera 20 to capture the front product P, as shown in FIG. 5.

A shielding member 60 is installed at the front end of the shelf S. The shielding member 60 functions to prevent the camera 20 and the moving device 32 from being exposed toward the front of the shelf S. The shielding member 60 has a panel part that shields the front of the shelf S, which can be used, for example, as a display panel for showing information such as the price of the products P displayed in the placement area. By using the shielding member 60, the moving device 32 and the camera 20 are not exposed to the outside and are also protected from external impacts.

In FIG. 5, the moving device 32, camera 20, and shielding member 60 are installed on the upper side of the shelf S. In this configuration, the camera 20 captures the product P on the shelf S to which the camera 20 is mounted.

Figure 6:
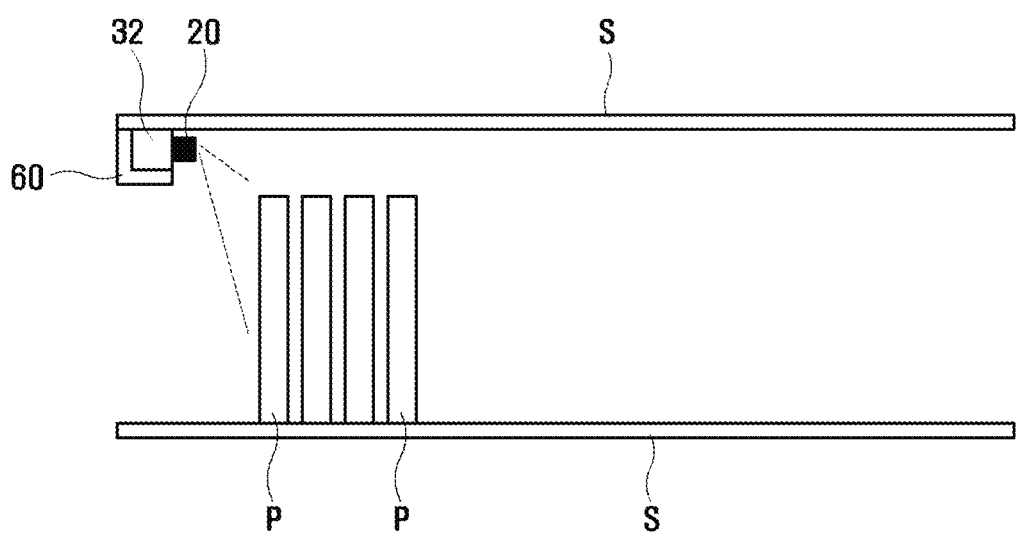
FIG. 6 is a view showing a modification of FIG. 5.

FIG. 6 is a view showing a modified example of FIG. 5. In FIG. 6, unlike FIG. 5, the moving device 32, camera 20, and shielding member 60 are installed on the lower side of the shelf S. In this configuration, the camera 20 captures the product P on the shelf below the one to which it is mounted, meaning the product P on the lower floor. This configuration allows for easier acquisition of the capture area since the distance between the camera 20 and the product P to be captured is slightly greater than in FIG. 5. Furthermore, the camera 20 can capture not only the front end of the placement area but also its middle and rear end areas. This enables capturing the returned product P within the image even if the returned product is placed in the middle or rear end of the placement area. Additionally, because the product P is not obscured by the shielding member 60, moving device 32, or camera 20, the buyer can easily check the entire product P visually.

Figure 7:
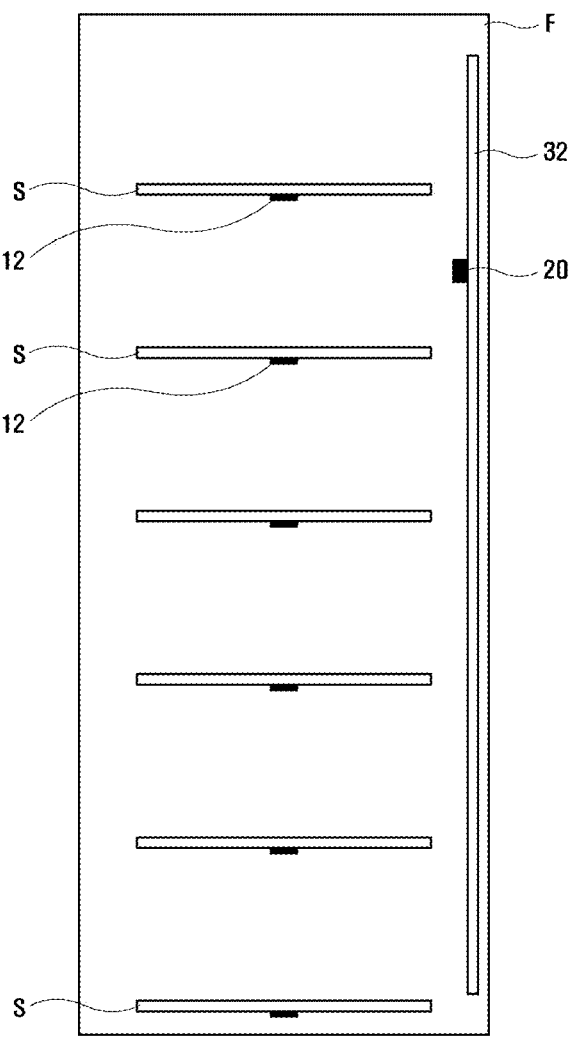
FIG. 7 is a schematic view of the unmanned sales system according to the second embodiment of the present invention.

FIG. 7 is a schematic view of the unmanned sales system according to the second embodiment of the present invention. In this embodiment and subsequent embodiments, the same reference numerals are used for components that are substantially the same as those in the previously described embodiment.

In this embodiment, the moving device 32 is arranged vertically along the right side within the frame F, allowing the camera 20 to move vertically along the guide rail 32a. Multiple shelves S are arranged in a layered manner in the vertical direction within the frame F. In this embodiment, each shelf S forms a single placement area. As in the first embodiment, the area on one shelf S can be divided into multiple placement areas, or, as in this embodiment, the entire area on one shelf S can form a single placement area. Each shelf S is equipped with a single weight sensor 12. The camera 20 moves vertically by the moving device 32 to capture the placement area of the shelf S where a weight change is detected by the weight sensor 12.

The configuration of this embodiment is suitable for an unmanned sales system with a relatively narrow frame F in the horizontal direction. In this case, a single camera 20 can provide a clear capture image of the entire area on the shelf S. Thus, by configuring as shown in FIG. 7, a single camera 20 can accurately identify the retrieved product P on each floor of the multi-layered structure.

Figure 8:
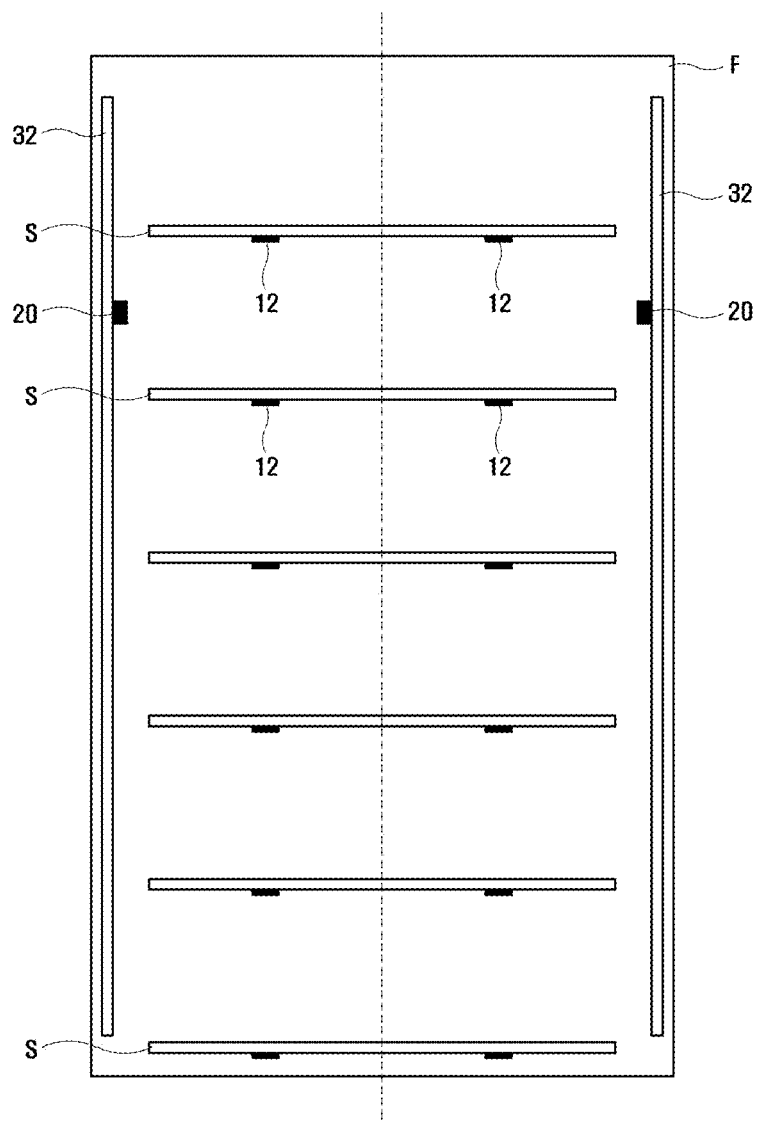
FIG. 8 is a view showing a modification of FIG. 7.

FIG. 8 shows a modified example of FIG. 7. In FIG. 8, similar to FIG. 7, the moving device 32 is arranged in the vertical direction, but a pair of moving devices 32 is positioned adjacent to each end of the shelf S within the frame F. In FIG. 8, the space on each shelf S is divided horizontally into left and right sections, forming left and right placement areas on each floor. Two weight sensors 12 are also installed on each floor, corresponding to the left and right placement areas. The left and right cameras 20 handle the left and right placement areas, respectively.

This configuration is suitable when the width of the frame F is slightly wider than in FIG. 7, making it inappropriate for a single camera 20 to capture the entire floor, or when each floor's area needs to be divided into two placement areas for displaying different products P.

Figure 9:
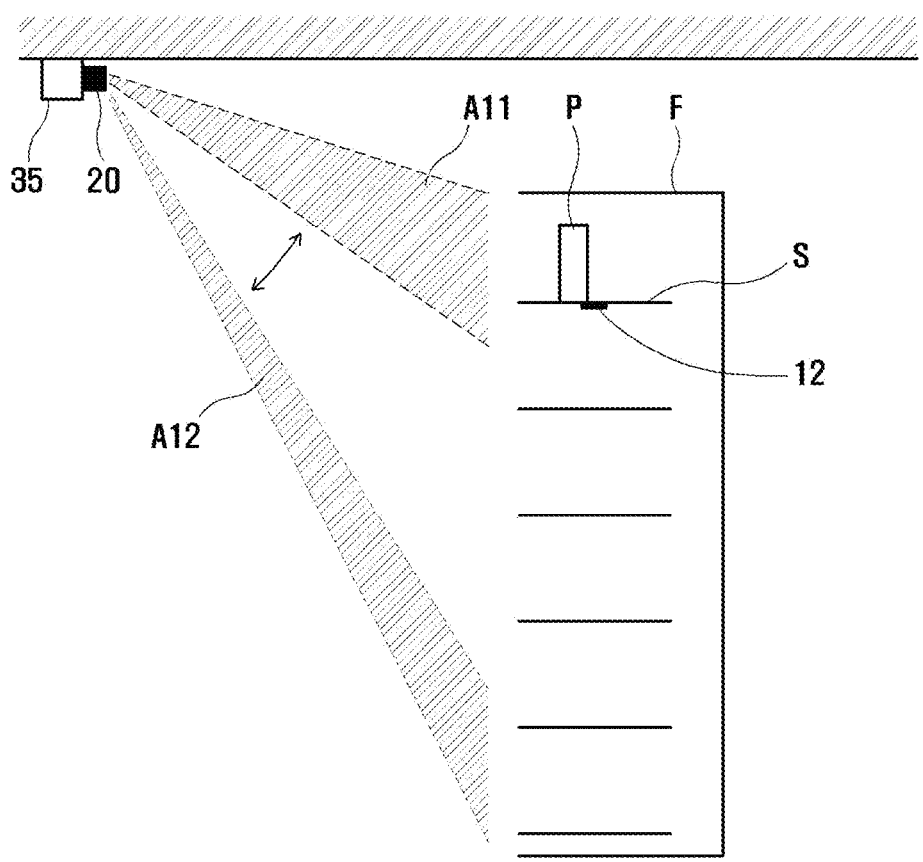
FIG. 9 is a view showing the third embodiment of the present invention.
Figure 10:
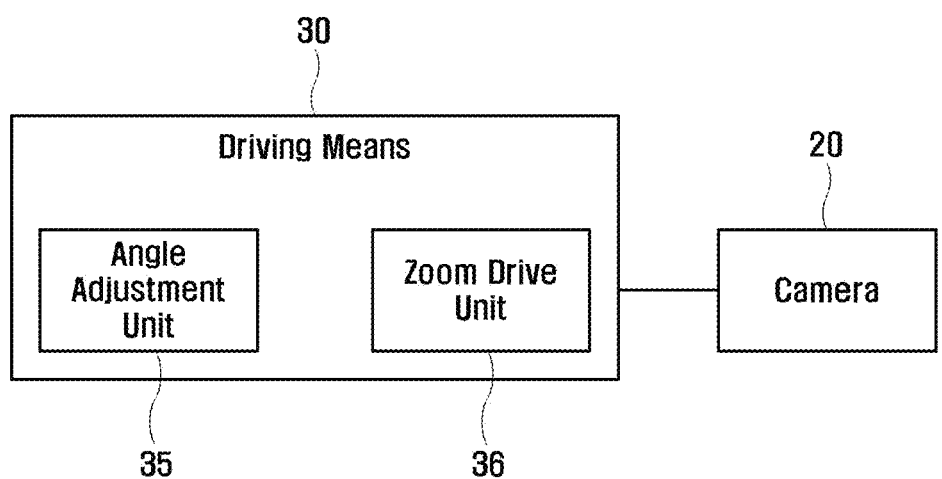
FIG. 10 is a block diagram showing the driving means of FIG. 9.

FIG. 9 shows the third embodiment of the present invention, and FIG. 10 is a block diagram showing the driving means in FIG. 9.

In the first and second embodiments described above, the driving means 30 comprises a moving device 32 that moves the camera 20 along the guide rail 32a. In contrast, in this embodiment, the driving means 30 includes an angle adjustment unit 35 that changes the capture angle of the camera 20.

As shown in FIG. 9, in this embodiment, the camera 20 is installed outside the unmanned sales system frame F at a certain distance, preferably on the ceiling. This allows the camera 20 to capture the areas on all shelves S within the frame F. However, in this embodiment, the camera 20 is configured not to capture the entire area within the frame F, but to capture a single placement area within the frame F. The capture area of the camera 20 is changed by altering the camera's capture angle through the angle adjustment unit 35. For example, as shown in FIG. 9, the camera 20 is controlled to capture placement area A11 or placement area A12 by adjusting the capture angle. The capture angle of the camera 20 is adjusted to capture the placement area where the weight sensor 12 detected a weight change, as in the previously described embodiments.

In FIG. 9, only the adjustment of the vertical angle of the angle adjustment unit 35 is illustrated, but the angle adjustment unit 35 may be configured to adjust the horizontal angle, or to adjust both vertical and horizontal angles. The angle adjustment unit 35 can adopt a well-known mechanical configuration that rotates the camera 20 to change its capture angle, so detailed illustrations and descriptions are omitted. The angle adjustment unit 35 and camera 20 of this embodiment may be equipped with two or more units as needed.

Preferably, in this embodiment, the driving means 30 further includes a zoom drive unit 36. The zoom drive unit 36 controls the capture range of the camera 20 to perform zoom-in and zoom-out according to the distance between the camera 20 and the placement area. In cases where the angle of the camera 20 is adjusted, as in this embodiment, the distance between the camera 20 and the placement area differs for each placement area. When capturing a placement area that is relatively close to the camera 20, such as area A11 in FIG. 9, compared to capturing a placement area that is relatively far from the camera 20, such as area A12, it is preferable to control the camera 20 to zoom in. Therefore, when adjusting the angle of the camera 20 to the placement area where the weight change was detected by the weight sensor 12, the zoom drive unit 36 adjusts the zoom-in or zoom-out degree of the camera according to the placement area to acquire a clearer image of the product P in that placement area. The degree of zoom-in or zoom-out can be set in advance with different values for each placement area. For example, in FIG. 9, the zoom level can be preset to zoom in by 1.5 times for capturing area A12, using area A11 as the default setting.

Figure 11:
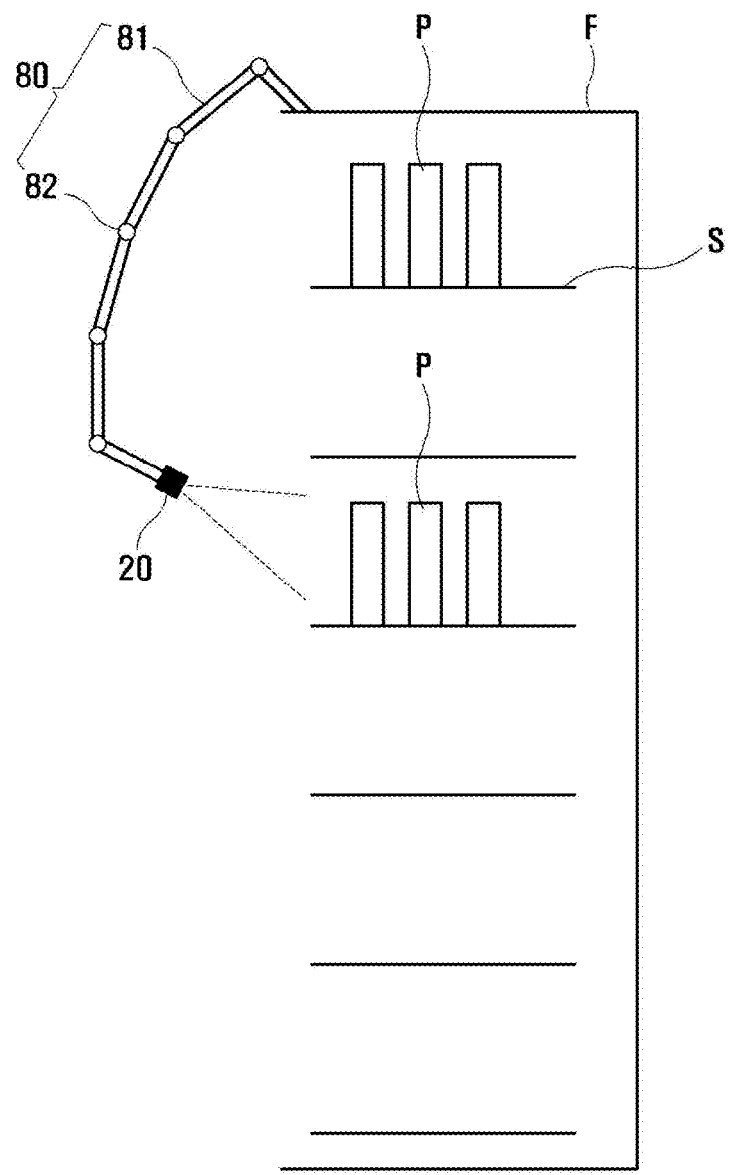
FIG. 11 is a view showing the fourth embodiment of the present invention.

FIG. 11 shows the fourth embodiment of the present invention. In this embodiment, the driving means 30 is configured as a multi-joint robot 80. The multi-joint robot 80 includes multiple arms 81, rotating axes 82 that connect each arm 81 to allow relative rotation, and multiple rotation motors (not shown) that control the rotation position of each arm 81 around its rotation axis 82. When the camera 20 is installed at the terminal end of this multi-joint robot 80, the position of the camera 20 can be freely set and moved by controlling the multi-joint robot 80. Thus, the camera 20 can be moved using the multi-joint robot 80 to capture the placement area where a weight change was detected by the weight sensor 12, allowing easy capturing of the product P in that placement area.

The unmanned sales system according to the embodiments of the present invention can be applied to various types of sales management systems for unmanned stores.

Figure 12:
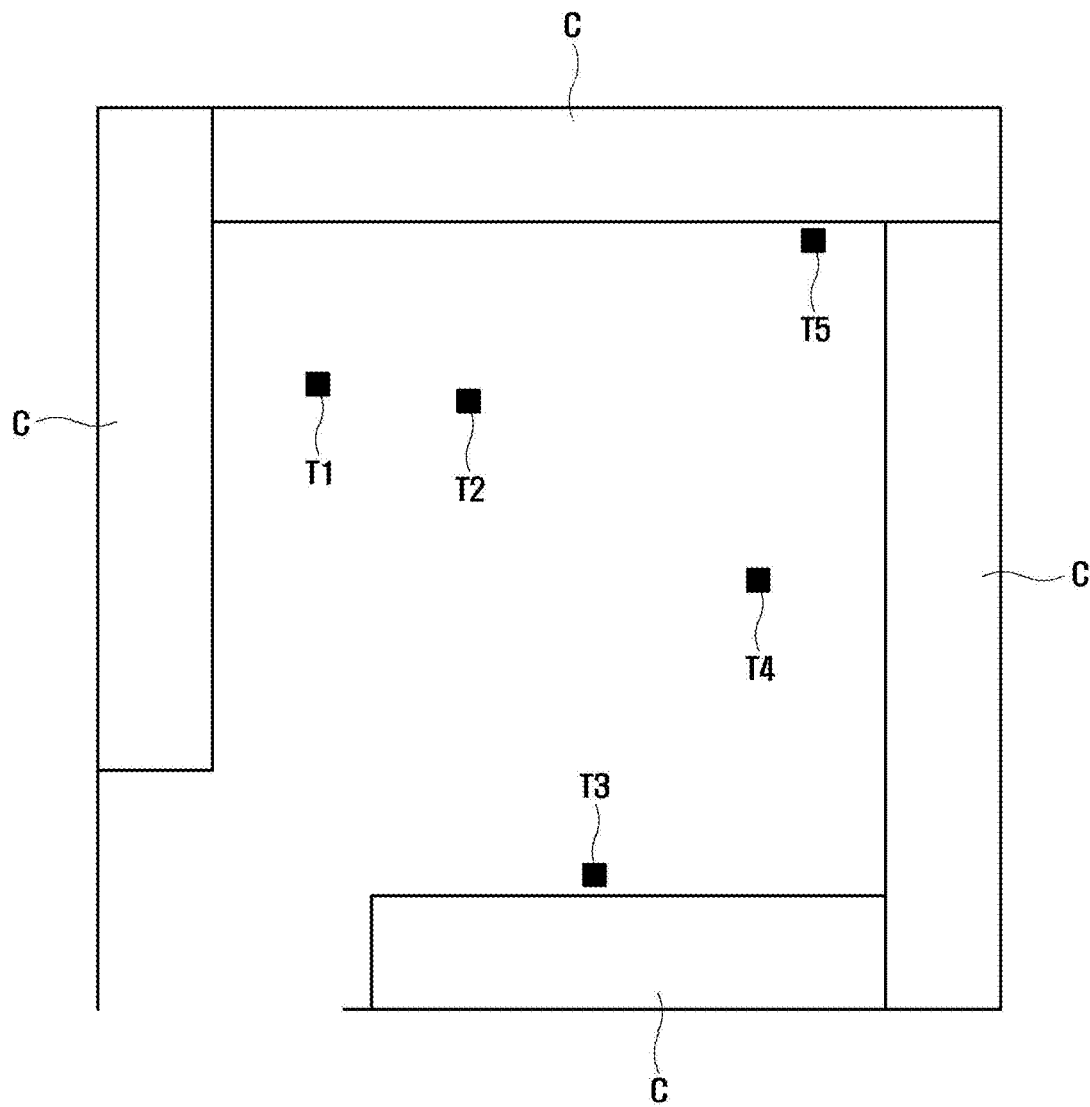
FIG. 12 is a schematic view of an unmanned store where the unmanned sales system of the present invention is introduced.

FIG. 12 is a schematic view of an unmanned store where the unmanned sales system of the present invention has been introduced. In FIG. 12, the reference numeral C represents the unmanned sales system of the present invention, and T1 to T5 are tags, which are examples of user devices 122 that form the identifying means 120 described below. FIG. 12 shows a state in which a plurality of unmanned sales systems C are prepared in the store, and five buyers with tags T1 to T5 have entered the store.

Figure 13:
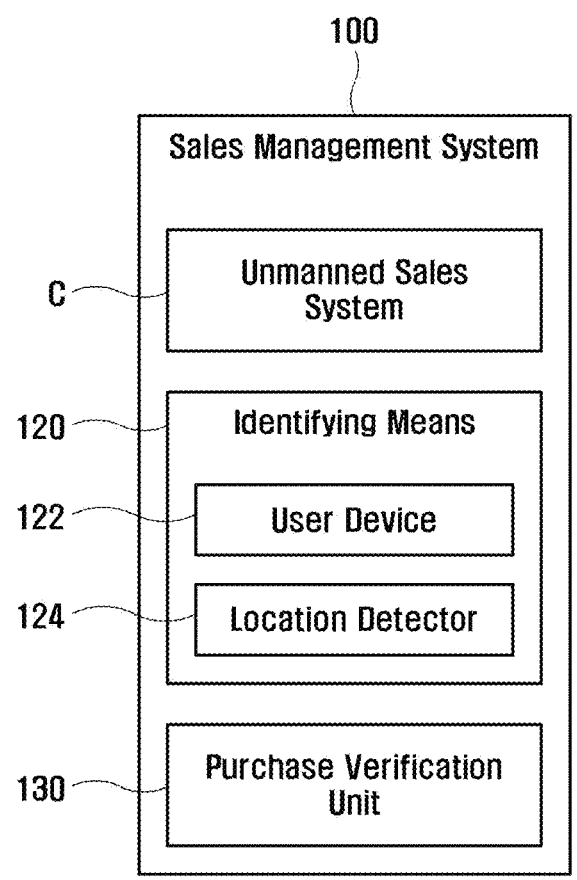
FIG. 13 is a block diagram of the sales management system of the present invention applied to the unmanned store in FIG. 12.

FIG. 13 is a block diagram of the sales management system of the present invention applied to the unmanned store in FIG. 12. The sales management system of the present invention comprises the unmanned sales system C as described above, an identifying means 120 for identifying each user entering the store, and a purchase verification unit 130 for confirming that the user who entered the store and retrieved a product is the buyer of that product.

The identifying means 120 is a means for identifying each user entering the store, and for example, includes a user device 122 which is possessed by the user in the store, and a location detector 124 that detects the location of the user device 122. Here, "identify" means that the location detector 124 detects the location of the user device 122 in the store.

For example, the user device 122 may be a mobile terminal owned by the user. If a mobile terminal is used as the user device 122, the location detector 124 can identify the user along with the location of the user device 122 in the store, and a separate payment unit (not shown) may automatically process the purchase payment for the mobile terminal.

In another example, the user device 122 may be a tag provided to each user entering the store. When a tag is used as the user device 122, it may not identify a specific user, but the location of the tag within the store can be identified by the location detector 124. The tag is, for instance, available at the store's entrance and is carried by the user upon entering the store. This tag provides a means for the location detector 124 to confirm the location of the tag within the store, such as through RFID. Multiple RFID readers are installed in the store as location detectors 124 capable of identifying the location of each tag. Depending on the type of tag, the location detector 124 may use an Ultra Wide Band (UWB) reader. Users continuously carry the tag while moving within the store, so the location detector 124 identifies the location of each tag (T1 to T5) within the store, as shown in FIG. 12.

The purchase verification unit 130 confirms a user as the buyer of the retrieved product P by associating the retrieved product P confirmed by the unmanned sales system C to have been taken from the shelf S, with the specific user device 122. The specific user device 122 in this instance is the one identified by the location detector 124 as being closest to the product P at the time of retrieval. For example, if tag T3 is confirmed as being closest to the placement area of the currently retrieved product P, the purchase verification unit 130 associates the retrieved product P with tag T3, and the holder of tag T3 is recorded as the buyer. The user submits the tag they are carrying to an unmanned payment system at the store's exit when leaving the store. The unmanned payment system can confirm the details of the products retrieved and associated with that tag via the purchase verification unit 130 and process the purchase payment accordingly.

In another example of the identifying means 120, a user location identification device that tracks the user's current position in the store based on captured video may be used. This method captures all people moving within the store, tracks their movement paths in real-time, and identifies the user performing the retrieval action for the retrieved product P to confirm them as the buyer. The user's identity is confirmed based on the similarity of their facial image, for example. Although this method requires a large amount of video processing for user identification, it offers high user convenience since it does not rely on a separate user device 122.

The embodiments of the present invention described above provide an unmanned sales system installed in an unmanned store, and a sales management system for unmanned stores using this system. The present invention proposes an idea for independently manufacturing only a shelf device as an individual unit within this unmanned sales system.

Figure 14:
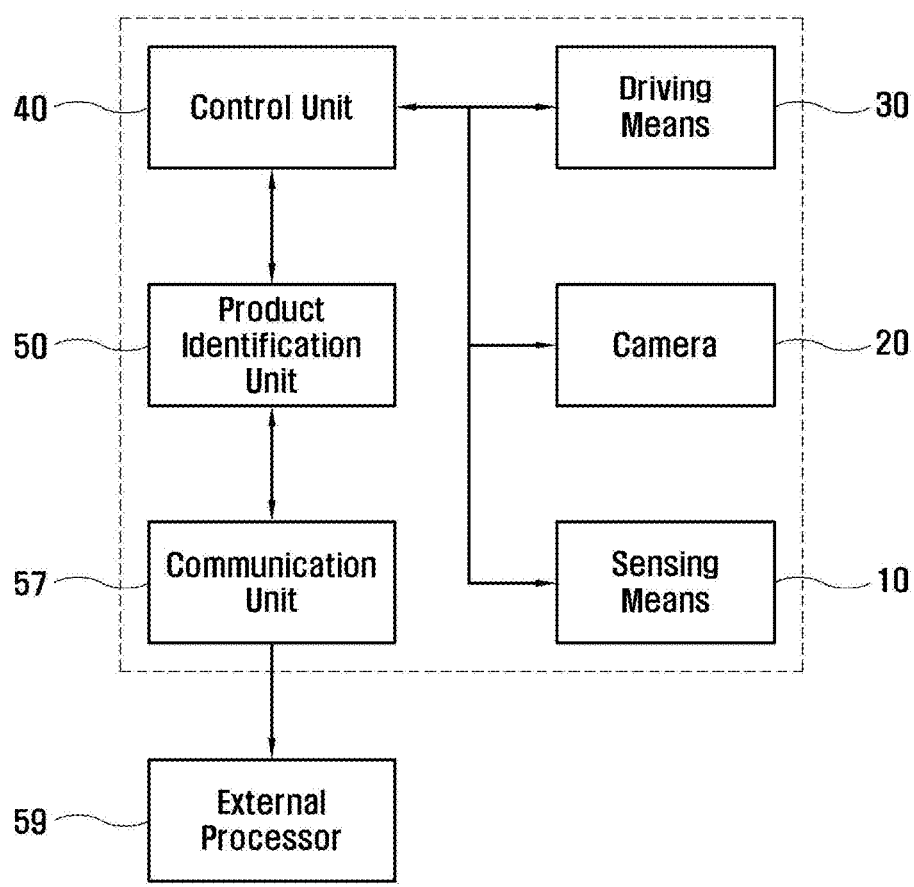
FIG. 14 is a block diagram of the shelf device of the present invention.

FIG. 14 is a block diagram showing the shelf device of the present invention.

The shelf device of the present invention constitutes part of the entire configuration of the unmanned store sales management system shown in FIG. 1 as a shelf device. The shelf device comprises a sensing means 10, a camera 20, a driving means 30, and a control unit 40. The shelf device of the present invention also obviously includes a shelf S where products to be sold are displayed. Since each of these elements is identical to those described with reference to FIG. 1, detailed descriptions are omitted, and the description of FIG. 1 is incorporated as the description of the shelf device in the present invention. Each element in FIG. 14 identical to those in FIG. 1 is assigned the same reference numerals as those in FIG. 1.

Furthermore, the detailed configurations and modifications of each element described with reference to FIG. 1 can be similarly applied to the shelf device of the present invention. In producing the shelf device as an independent unit, the configuration of the first embodiment of the unmanned sales system, as described with reference to FIGS. 2 to 6, is appropriate, in which the guide rail 32*a* is arranged horizontally at the front end of the shelf S, and the camera 20 moves horizontally along the edge of the front end of the shelf S by the moving motor 32*d*.

By producing the shelf device as an independent unit in this way, the functionality of the unmanned store sales management system of the present invention can be implemented simply by replacing only the existing shelves used for product display in a conventional store with the shelf device of the present invention. In other words, an unmanned store sales management system configured as shown in FIG. 1 includes a configuration in which multiple shelf devices are arranged in layers and other configurations, such as frames or doors. This modular shelf device allows easy and cost-effective remodeling of an existing store into an unmanned store.

Unlike FIG. 1, the shelf device in FIG. 14 includes a communication unit 57, which provides a means to communicate with an external processor 59 separate from the shelf device. The external processor 59 performs the same function as the product identification unit 50 shown in FIG. 1, that is, it identifies the product based on the image at the outside of the shelf device. The image captured by the camera 20 is transmitted to the external processor 59 through the communication unit 57, and the external processor 59 identifies the retrieved/inserted product from the transmitted image. The external processor 59 may be implemented as a separate computer or processor provided within the store or as a separate server or computer connected through a network over a long distance.

Alternatively, the shelf device may be configured with a product identification unit 50 instead of the communication unit 57. By including the configuration of the product identification unit 50 shown in FIG. 1 within the shelf device, product identification can be completed within the shelf device itself without a separate external processor 59. However, even in this case, it is preferable to include the communication unit 57 to transmit information about the identified product to the sales management system in the store, as the store's sales management system will require information on the identified product from the product identification unit 50.

Although the present invention has been described with reference to the embodiments shown in the drawings, this is merely exemplary, and it will be understood by those skilled in the art that various modifications and equivalent other embodiments are possible. Therefore, the true scope of technical protection of the present invention should be determined by the technical spirit of the claims.

We claim:

1. An unmanned sales system comprising:
   one or more sensing means for sensing whether a product to be sold is retrieved from and/or inserted onto a shelf on which the product is placed, wherein the shelf is divided into one or more placement areas, and each of the sensing means respectively senses change in each of the one or more placement areas;
   a camera for capturing an image of product on the shelf within a capturing area, wherein the camera is movably installed on a driving means;
   the driving means for driving the camera to change the capturing area of the camera;
   a control unit for controlling the driving means to change the capturing area of the camera; and
   a product identification unit for identifying the retrieved and/or inserted product based on the image captured by the camera,
   wherein the sensing means detects a change in a product being retrieved from and/or inserted onto the shelf in a placement area and sends the change to the control unit,
   upon receiving the change in the product by the sensing means, the control unit controls the driving means to move the camera to the placement area where the change is sensed so that the capturing area of the camera covers the placement area where the change is sensed,
   the camera captures the image of the product retrieved from and/or inserted onto the shelf in the placement area and sends the image to the product identification unit via the control unit, and
   the product identification unit identifies the retrieved and/or inserted product based on the image captured by the camera.

2. The unmanned sales system of claim 1, wherein the sensing means comprises a plurality of weight sensors installed in each of the plural placement areas.

3. The unmanned sales system of claim 1, wherein the sensing means comprises an operation sensor for sensing retrieving or inserting action for the product by a buyer in each of the plural placement areas.

4. The unmanned sales system of claim 1, wherein the driving means comprises a moving device for moving the camera.

5. The unmanned sales system of claim 4, wherein the moving device comprises:
   a guide rail, wherein the camera is movably installed on the guide rail, and
   a movement motor for moving the camera along the guide rail.

6. The unmanned sales system of claim 5, wherein the moving device is arranged horizontally along the shelf.

7. The unmanned sales system of claim 6, wherein the moving device is arranged along an edge of a front end of the shelf.

8. The unmanned sales system of claim 7, wherein the moving device is installed on an upper side of the shelf.

9. The unmanned sales system of claim 7, wherein the moving device is installed on a lower side of the shelf.

10. The unmanned sales system of claim 7, wherein a shielding member is provided at the front end of the shelf to prevent the camera and the moving device from being exposed frontward of the shelf.

11. The unmanned sales system of claim 6, wherein a plurality of said shelves are arranged in a layered manner in the vertical direction, and a plurality of said cameras and a plurality of said moving devices are equipped corresponding to each of the plurality of shelves.

12. The unmanned sales system of claim 5, wherein a plurality of said shelves are arranged in a layered manner in the vertical direction, and the moving device is arranged in the vertical direction.

13. The unmanned sales system of claim 12, wherein a pair of said moving devices is provided at positions adjacent to each side of the shelf.

14. The unmanned sales system of claim 13, wherein the driving means further comprises a zoom drive unit that controls the camera's capture range to perform zoom-in and zoom-out shooting according to a distance between the camera and the placement area.

15. The unmanned sales system of claim 1, wherein the driving means comprises an angle adjustment unit that changes the capture angle of the camera.

16. The unmanned sales system of claim 1, wherein the driving means comprises a multi-joint robot with the camera installed at a terminal end thereof.

17. A sales management system for unmanned stores, comprising the unmanned sales system of claim 1.

18. The sales management system for unmanned stores of claim 17, further comprising:
   an identifying means for identifying each user who has entered the store; and
   a purchase verification unit for verifying the user as a buyer of the retrieved product, by associating the product confirmed by the unmanned sales system to have been retrieved from the shelf, with the user identified by the identifying means at the time of retrieval.

19. The sales management system for unmanned stores of claim 18, wherein the identifying means comprises:
   a user device, wherein the user device comprises one of a personal mobile terminal of the user and a tag provided to the user entering the store; and a location detector for detecting a location of the user device in the store.

20. A shelf device comprising:

a shelf on which products to be sold are placed;

one or more sensing means for sensing whether a product is retrieved from and/or inserted onto a shelf on which the product is placed, wherein the shelf is divided into one or more placement areas, and each of the sensing means respectively senses change in each of the one or more placement areas;

a camera for capturing an image of product on the shelf within a capturing area, wherein the camera is movably installed on a driving means;

the driving means for driving the camera to change the capturing area of the camera;

a control unit for controlling the driving means to change the capturing area of the camera; and a product identification unit for identifying the retrieved and/or inserted product based on the image captured by the camera, wherein the sensing means detects a change in a product being retrieved from and/or inserted onto the shelf in a placement area and sends the change to the control unit, upon receiving the change in the product by the sensing means, the control unit controls the driving means to move the camera to the placement area where the change is sensed so that the capturing area of the camera covers the placement area where the change is sensed, the camera captures the image of the product retrieved from and/or inserted onto the shelf and sends the image to the product identification unit via the control unit, and the product identification unit identifies the retrieved and/or inserted product based on the image captured by the camera.

21. The shelf device of claim 20, wherein the driving means comprises a moving device for moving the camera.

22. The shelf device of claim 21, wherein the moving device comprises:

a guide rail, wherein the camera is movably installed on the guide rail, and a movement motor for moving the camera along the guide rail.

23. The shelf device of claim 20, further comprising a communication unit for transmitting the image captured by the camera to an external processor that performs operation of identifying the product.

24. The shelf device of claim 20, further comprising a product identification unit for identifying the retrieved and/or inserted product based on the image captured by the camera.

* * * * *